Sept. 2, 1952 T. K. COX ET AL 2,609,417
RETRACTILE CORD AND METHOD OF MAKING IT
Filed May 6, 1949 4 Sheets-Sheet 1

INVENTORS
T. K. COX
F. P. LYONS
BY
ATTORNEY

Sept. 2, 1952 T. K. COX ET AL 2,609,417
RETRACTILE CORD AND METHOD OF MAKING IT
Filed May 6, 1949 4 Sheets-Sheet 2

INVENTORS
T. K. COX
F. P. LYONS
BY
ATTORNEY

Sept. 2, 1952 T. K. COX ET AL 2,609,417
RETRACTILE CORD AND METHOD OF MAKING IT
Filed May 6, 1949 4 Sheets-Sheet 3
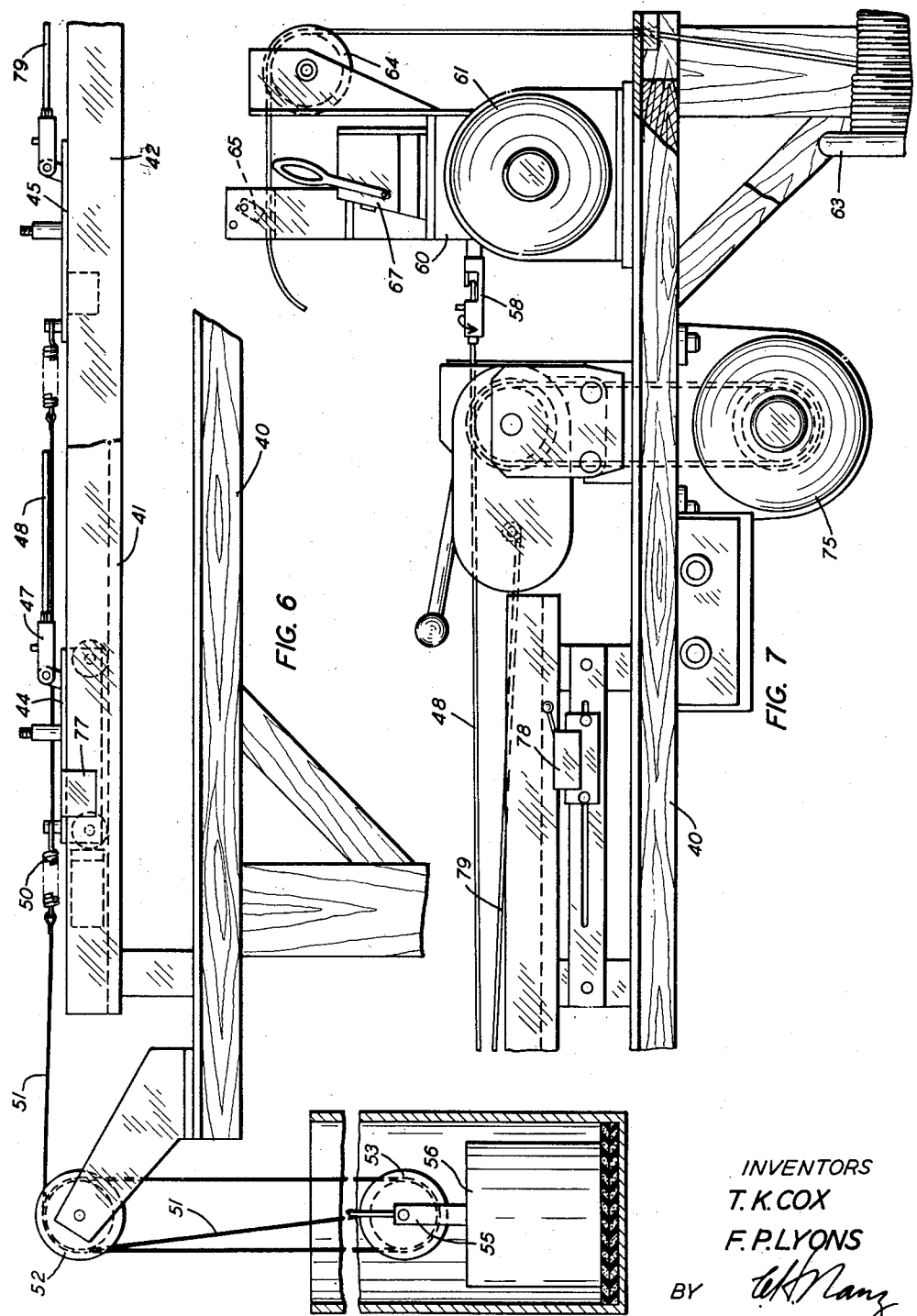
INVENTORS
T. K. COX
F. P. LYONS
BY
ATTORNEY Sept. 2, 1952  T. K. COX ET AL  2,609,417
RETRACTILE CORD AND METHOD OF MAKING IT Filed May 6, 1949  4 Sheets-Sheet 4

INVENTORS
T. K. COX
F. P. LYONS
BY
ATTORNEY

Patented Sept. 2, 1952

2,609,417

UNITED STATES PATENT OFFICE 2,609,417

RETRACTILE CORD AND METHOD OF MAKING IT

Thomas K. Cox, Randallstown, and Francis P. Lyons, Baltimore, Md., assignors to Western Electric Company, Incorporated, New York, N. Y., a corporation of New York Application May 6, 1949, Serial No. 91,738

10 Claims. (Cl. 174—69)

1

This invention relates to retractile cords and methods of making them, and particularly to retractile cords having outer jackets of vulcanized elastomer compounds, and methods of making such cords.

In the electrical communications art, there is need for retractile cords that are pleasing in appearance and have a long effective life. It also is desirable for such cords to have sufficient retractility to insure that they will return promptly to their normal retractile form after having been extended and then released, without being so strongly retractile that it requires an excessive amount of force to extend them. If a retractile cord is too unyielding, instead of the cord extending when a pull is exerted thereon, the instrument to which it is attached may be moved over or off of its support. This condition is particularly undesirable when a retractile cord is connected to a desk telephone instrument, for example.

It has been proposed heretofore to make retractile cords from cordage having a jacket made of an extruded and vulcanized compound. In the past such cordage has had a flexible core of generally circular cross-section beneath the jacket. This core was made by stranding together a plurality of individually insulated tinsel conductors and filler cords, and applying a full covering of binder threads helically around the stranded assembly to hold the elements thereof in place and to make the outer surface of the core as smooth as possible. While it is possible to make retractile cords from such cordage, the fact that the conductors are twisted together in the stranding operation introduces difficulties that require care to overcome, and the stranding operation itself is costly. In addition, the use of filler cords to fill the spaces between the conductors when the conductors are stranded together, and the necessity of providing binder cords to hold the assembly together add materially to the cost of such cords. The use of stranded cores for cords having extruded and vulcanized jackets also frequently results in the formation of jackets having uneven surfaces despite the fact that filler cords and a covering of binder cords are included in such cores to render them as nearly cylindrical as possible.

An object of this invention is to provide new and improved cords and methods of making them.

Another object of the invention is to provide new and improved retractile cords having outer vulcanized jackets thereon, and methods of making such cords.

Still another object of the invention is to provide improved jacketed retractile cords of simple and inexpensive construction, and to provide new, simple and effective methods of making such cords.

A cord illustrating certain features of the invention, and made by a method employing features of the invention, may comprise a plurality of parallel insulated conductors having a vulcanized jacket thereover, which cord has been twisted about its longitudinal axis, wound into a helix while twisted, and set in such twisted, helical form.

The above-mentioned and other objects and features of the invention will be apparent from the following detailed description of specific embodiments thereof and from the annexed drawings, in which:

Fig. 6 is a front elevation of the portion of the apparatus shown in Fig. 1;

Fig. 7 is a front elevation of the portion of the apparatus shown in Fig. 2;

Figure 1:
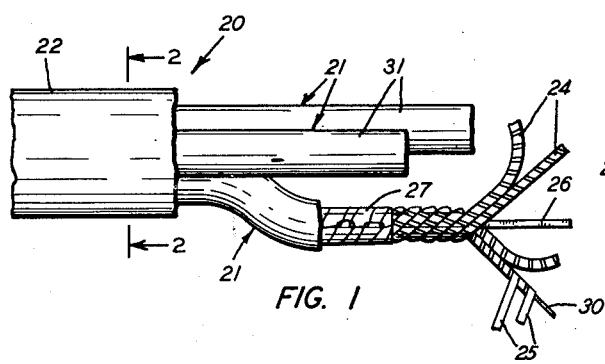
Fig. 1 is an enlarged view of a piece of cordage suitable for use in making cords embodying the invention.

Referring now to the drawings, there is shown in Fig. 1 a piece of cordage 20 of a type from which cords embodying the invention may be made. This cordage has a core consisting of individually insulated tinsel conductors 21—21 assembled in parallel relationship. The resulting core is enclosed in a protective jacket 22. In applying the jacket 22, the conductors 21—21 are guided into an extruder in parallel relationship, and a neoprene (polychloroprene) jacketing compound is extruded over the conductors. The jacket then is subjected to heat and pressure to cure the compound of which it is made. While not strictly a vulcanizing process, the method used to cure the neoprene jacket 22 is so like the process used to vulcanize rubber that the neoprene compound jacket 22 will be referred to as a vulcanized jacket.

The insulated tinsel conductors 21—21 are of known construction, and each includes a plurality of tinsel threads 24—24 made by winding tinsel ribbons 25—25 around cotton cords 30—30. The tinsel threads 24—24 of each conductor are served around a cotton cord 26, and the resulting assembly is enclosed in a cotton braid 27. A rubber insulating compound of distinctive color is extruded over each of the cotton braids, and is vulcanized fully by known procedures to form an insulating covering 31 for each conductor. The groups of tinsel threads form the conducting elements of the tinsel conductors, and the resulting conductors are extremely flexible and can withstand repeated bending and twisting stresses, such as they encounter in use.

Cordage of this construction includes no filler cords or binder cords, such as are employed to round out and hold together the core when the individual conductors are stranded before they are enclosed in a vulcanized jacket. They are not needed when the conductors are parallel as the jacket is applied thereover, because in that case a smooth jacket is formed despite the irregular contour of the core formed by the parallel conductors.

Figure 2:
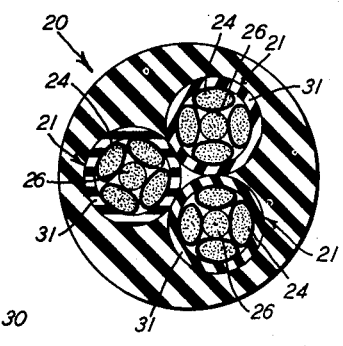
Fig. 2 is a further enlarged cross-sectional view taken along line 2—2 of Fig. 1.

As is evident from Fig. 2, the jacketing material enters and fills the spaces between the conductors when they are parallel at the time the jacket is formed thereover, and the resulting jacket is smooth. The fact that the jacketing material enters the spaces between the conductors is important because the added jacketing material required to fill these spaces provides increased strength to the cordage and is helpful in the formation of retractile cords. Thus, when this type of parallel-conductor cordage is made, the cost of the filler and binder materials is eliminated, as is also the cost of the stranding and binder serving operations. Furthermore, retractile cords having superior properties may be produced from such cordage.

Figure 3:
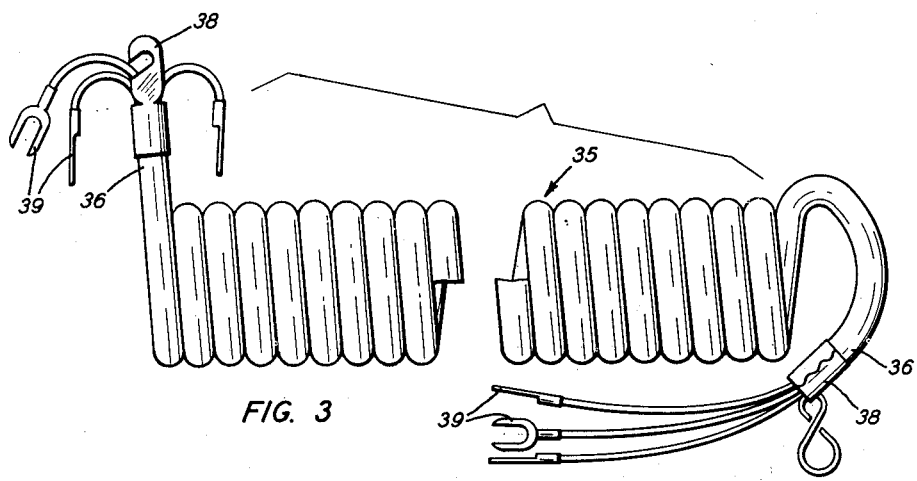
Fig. 3 is a side view of a retractile cord forming a specific embodiment of the invention.

A retractile cord made from cordage of the type shown in Figs. 1 and 2 is disclosed in Fig. 3 of the drawings. This retractile cord consists of a generally helical body portion 35, and straight-end portions 36—36. Hook-type stay bands 38—38 are secured on the straight ends of the cord, and tips 39—39 used to connect the cord to communication equipment, or the like, are attached to the ends of the individually insulated conductors from which the jacket has been removed so that the conductors are free.

This retractile cord is made by twisting a length of cordage, such as that shown in Figs. 1 and 2, about its longitudinal axis while maintaining tension thereon to prevent the cord from kinking up, coiling the twisted cord into a helix, and setting the cord in its twisted, helical form by heating it. The twist imparted to the cord before it is wound into a helix tends to cause the convolutions of the helix to press against one another, and thereby causes the finished cord to resume its close helical shape when the cord is extended and then released. The jacket on the cord has already been vulcanized to a standard commercial cure, and when the cord is heated the jacket is set in helical shape with these stresses still in the cord. The added jacketing material that fills the spaces between the conductors provides additional material to be set in helical form, and thereby assists in holding the finished cord in its twisted, helical shape. The cord is maintained in normal helical form by the stresses caused by the twisting of the cord, but the stresses do not distort the cord. Of course, the helically-set jacket will tend to resume its helical shape when it is released after having been extended, but the retractile force exerted by the jacket alone is insufficient to cause the cord to return to a helix in which the convolutions are pressed together tightly. The insulating coverings on the conductors also may be set somewhat by the heat treatment and may assist in retaining the cord in its helical shape.

The twist given to the cord may be applied at the same time that the cordage is being wound in helical form, or the twisting and coiling steps may be performed sequentially. One type of apparatus that may be employed for twisting and coiling the cord sequentially is shown in Figs. 6 to 9, inclusive, of the attached drawings. The apparatus shown in these figures is disclosed in detail and claimed in W. L. Ames Patent No. 2,565,465, granted August 28, 1951.

This apparatus comprises a frame 40, which supports a pair of tracks 41 and 42 in which carriages 44 and 45, respectively, ride. Since the carriages 44 and 45 and their associated parts are identical in construction, only the carriage 44 and the parts associated therewith will be described in detail. The carriage 44 is provided at its right hand end with a clamp 47 designated to engage one end of a cord 48 cut from cordage of the type described previously. At the opposite end of the carriage a spring 50 is secured, and a cable 51 is connected to the spring 50. The cable 51 passes over pulleys 52—52 and 53—53, with the opposite end thereof secured to a block 55, which supports the pulleys 53—53. A weight 56 is suspended from the block 55, and this weight tends to pull the carriage 44 to the left on the track 41. The carriage 44 is supplied with a suitable brake (not shown) to prevent the weight 56 from drawing the carriage along the track 41 too rapidly.

A second clamp 58 is designed to engage the opposite end of the cord 48. The clamp 58 is rotated in the direction indicated by the arrow by a suitable driving mechanism 60, actuated by a motor 61. The portion of the apparatus described thus far is designed to twist the cord around its longitudinal axis while maintaining tension thereon.

Figure 5:
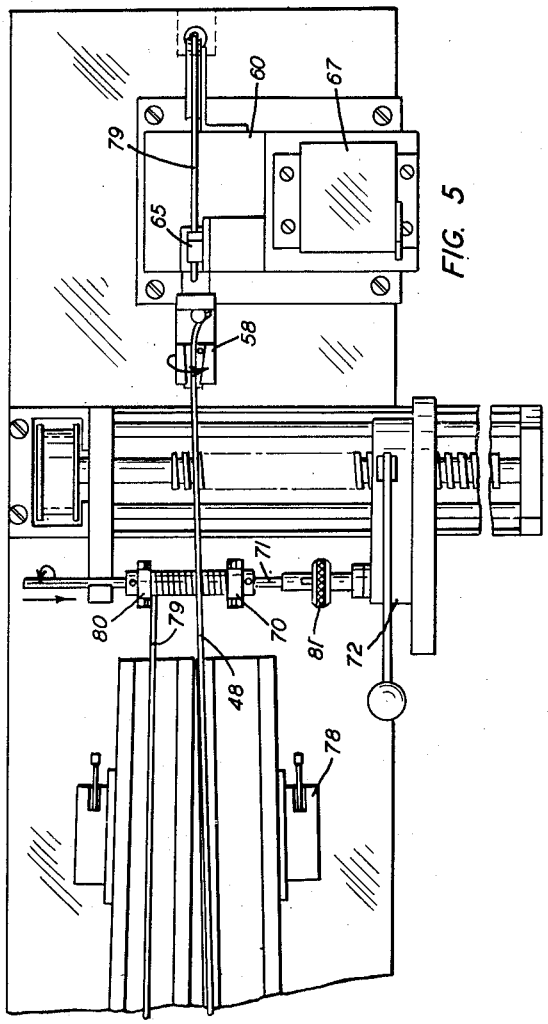
Fig. 5 is a fragmentary, top plan view of another portion of the apparatus shown in Fig. 1, the view shown in Fig. 2 being substantially a continuation of that shown in Fig. 1.

In performing the twisting operation, the end of a supply of cordage is withdrawn from a supply reel 63, and is advanced over a pulley 64 and then to the left, as seen in Figs. 5 and 7, until it is carried past a catch 65 which prevents movement of the cordage in the opposite direction. The carriage 44 is moved to the extreme right end of the track 41, the end of the cordage is secured in the clamp 47, and the carriage is released. When the carriage 44 is freed, the weight 56 draws the carriage to the extreme left end of the track 41, and will withdraw a length of cordage from the supply reel 63. This operation measures out a desired length of cordage, and the cordage is severed at such a point as to provide a straight cord 48 to be processed into a retractile cord. The free end of the cordage from which the cord has been severed is held by the catch 65 so that additional cord lengths may be withdrawn and cut from the cordage.

The free end of the cord 48 then is secured in the clamp 58, and the cord is released. The carriage 44 is drawn slightly to the right when the end of the cord 48 is secured in the clamp 58, so that the weight 56 tends to urge the carriage to the left, and applies tension to the cord. The motor 61 then is actuated to revolve the clamp 58, and the cord 48 is twisted a sufficient number of times to impart the desired degree of retractility to the finished cord. Since the clamp 47 is not rotatable, the end of the cord held therein is held fixed while the clamp 58 is rotating, and, as a result, the cord is twisted about its longitudinal axis.

The rotation of the clamp 58 is in such direction that the twist imparted to the cord 48 is in a right hand direction looking along the longitudinal axis of the cord. Consequently, the individual conductors forming the core of the cord will be twisted around the axis of the cord in long-lay helices, which advance away from the observer in a right hand direction. Thus, the twist given to the cord and the lay of the helix into which the twisted cord is wound are in the same direction.

The number of twists given to the cord 48 will depend upon a number of factors, among which are the construction of the cord itself, the number of conductors in the cord, the age of the cord, the size of the cord, and the degree of retractility desired in the finished retractile cord. When the desired number of twists has been determined, a revolution counter 67 is set so that the motor 61 will be deenergized when the clamp 58 has been turned the preselected number of times.

Figure 8:
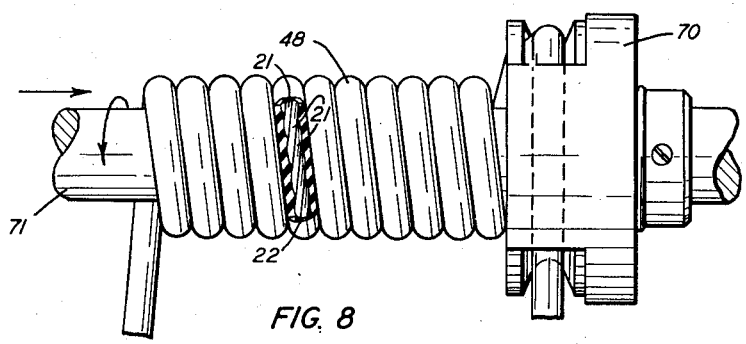
Fig. 8 is an enlarged, fragmentary view of a mandrel forming a part of the apparatus shown in Figs. 2 and 4.

After this pretwist has been given to the cord 48, the end thereof which is secured in the clamp 58 is removed therefrom, and then is secured in a clamp 70 mounted on a mandrel 71. The cord 48 is held against untwisting during its transfer from the clamp 58 to the clamp 70 so that the pretwist given to the cord is retained therein. The mandrel 71, a portion of which is shown in greater detail in Fig. 8, is turned in the direction of the curved arrow in that figure by means of a gear drive 72. The entire gear drive 72 and the mandrel 71 carried thereby are advanced by a screw 74 in the direction shown by the straight arrows in Figs. 5 and 8. The screw 74 and the gear drive 72 are actuated by means of a motor 75.

When it is desired to coil the pretwisted cord 48 into a helix, the motor 75 is energized, whereby the mandrel 71 begins to rotate and at the same time to advance longitudinally. This causes the cord to be wound on the mandrel in the form of a close, tight helix, such as is shown in Fig. 8. While the cord 48 is being wound helically on the mandrel 71, tension is maintained thereon by the weight 56 pulling against the carriage 44, thereby preventing kinking of the cord. As the cord is wound on the mandrel 71, the carriage 44 is drawn to the right on the track 41, and this operation continues until a plate 77 mounted on the carriage 44 engages a switch 78 mounted adjacent to the track 41 almost at the end thereof near the mandrel 71. When the plate 77 engages the switch 78, the motor 75 is deenergized, and the winding operation ceases.

While the cord 48 is being wound on the mandrel 71, the end of the cordage held by the catch 65 is secured in the clamp mounted on the carriage 45, the carriage 45 is drawn to the left by its associated weight, and the cordage then is severed near the catch 65 to form another straight cord 79, which is to be made into a retractile cord. The free end of the cord 79 is secured in the clamp 58, and the motor 61 is started to cause the cord 79 to be twisted about its longitudinal axis. Thus, while the cord 48 is being wound on the mandrel 71, the second cord 79 is being pretwisted, and the cord 79 will be ready to be wound helically on a mandrel by the time the winding operation has been completed on the cord 48.

As soon as the cord 48 has been wound on the mandrel 71, the end of the cord is released from the clamp 47, and is secured in a clamp 80 positioned loosely on the mandrel 71, after which the clamp 80 is secured firmly to the mandrel 71. The mandrel 71 then is released from a chuck 81, which connects it to the gear drive 72, and the mandrel with the cord wound helically thereon is removed from the twisting and coiling apparatus.

A mandrel identical with the mandrel 71, and provided with clamps like the clamps 70 and 80, then is fastened in the chuck 81. The end of the cord 79 held by the rotatable clamp 58 is released therefrom, and is secured in the clamp on the new mandrel corresponding to the clamp 70. The motor 75 then is energized to wind the cord 79 into a helix on the new mandrel. The above-outlined steps are repeated over a given work period to load a series of mandrels with pretwisted, helically wound cords. Figs. 4, 5, 6 and 7 show the cord 79 being wound into a helix on a mandrel while the cord 48 is being twisted about its longitudinal axis.

Figure 9:
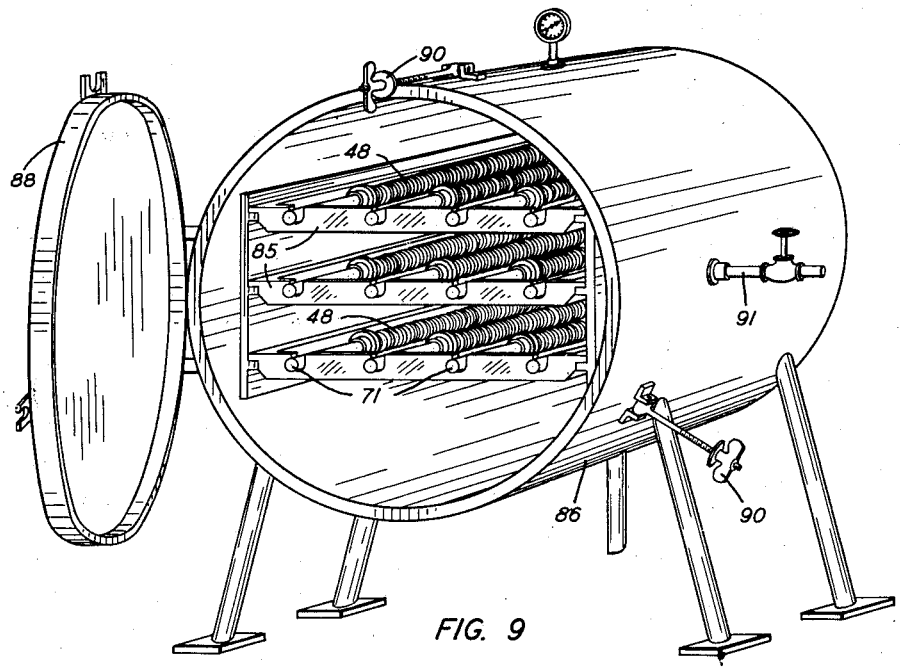
Fig. 9 is a perspective view of an oven designed to carry out one step of methods embodying the invention.

The mandrel 71 with the helically wound cord 48 clamped thereto, and a number of other similarly loaded mandrels, are placed in a series of frames 85—85, which are introduced into an oven 86 (Fig. 9). After the loaded frames are placed in the oven 86, a door 88 is closed and secured in place by means of clamps 90—90, whereupon steam is introduced into the oven through an inlet pipe 91. The helically wound cords are heated in the oven 86 for a period sufficiently long to cause the jackets of the cords to be set in the helical shape they assume on the mandrels, after which the steam is shut off and the frames are removed from the oven. If desired, the oven 86 may be heated electrically, or otherwise, since heat rather than pressure is required to set the jackets in helical form.

After the cords have cooled, they may be removed from the mandrels and stored until such time as they are to be made into finished cords. To form finished cords, portions of the jackets are removed from the ends thereof, and stay bands and tips are applied thereto, as shown in Fig. 3. The resulting retractile cords may be attached to suitable apparatus, such as telephone instruments, or the like, in a known manner.

As pointed out previously, the pretwist given to a cord before it is wound into a helix upon the mandrel is such as to cause the convolutions of the helix to be pressed together with a predetermined degree of force, and, in consequence, the finished cord has a predetermined degree of retractility. In a given cord, the pretwist given thereto about its longitudinal axis tends to produce a right hand twist to the conductors forming the core of the cord, and the pretwisted cord is formed in a helix which also extends in a right hand direction. Consequently, the stresses present in the cord because of the pretwisting operation are accentuated when the normally retracted cord is extended, as it is in use, because the act of extending the cord tends to be opposed by the pretwist given to the cord.

Because of the resiliency of the cord, it tends to resist outward extension, and the further the cord is extended, the greater it resists being extended. As a result, when an extended cord is released, the cord resumes its initial, tight helical configuration quickly, and maintains that configuration until the cord is again extended in its normal use. Obviously, the retractile forces exerted by the cord should not be so great that the cord may not be extended readily in service. If the cord is too unyielding, a telephone instrument, or the like, to which it is attached may be slid across or off its support instead of the cord expanding when a pull is exerted upon the cord, and the cord must be extensible with sufficient ease to prevent movement of the instrument with which it is associated.

One of the important features of cords embodying the invention is the fact that the retractility thereof may be varied by varying the amount of pretwist given to the cord before it is wound into helical shape. The effect of the pretwist also may be varied by varying the direction in which the pretwisted cord is wound in helical form. A cord having had a given amount of pretwist given thereto will be very retractile when it is wound in a helix which extends in the same direction as does the pretwist. On the other hand, a cord given the same amount of pretwist and then wound in a helix which extends in a direction opposite to that of the pretwist not only will be much less retractile, but will tend to resist longitudinal compression. Thus, when a highly retractile cord is desired, the pretwist and the helix both should extend in the same direction, that is, either both right or both left. When a less retractile cord is desired, the pretwist and the helix may extend in opposite directions, that is, one to the right and one to the left.

The fact that the cordage from which retractile cords embodying the invention are formed has a core consisting solely of parallel-laid, individually insulated conductors, makes it possible to regulate the retractility of the finished cords over a very wide range, since the cords are free to be twisted readily in either a right hand or a left hand direction and a considerable amount of twist may be given thereto in either direction. This is not the case when the cordage employed has a core made up of individually insulated conductors twisted or stranded together with filler cords.

It is obvious that, if the cordage from which a retractile cord is to be made already has the conducting elements thereof twisted together, care must be taken in further twisting the cord to impart a pretwist thereto. If such a cord is twisted in a direction such as to increase the twist caused by the stranding operation, the conductors may be twisted so tightly that the tinsel ribbons from which they are made may be broken during the twisting operation, or, if they are not broken then, they may be broken when the cord is extended in service. On the other hand, if a cord having a core including stranded conductors is pretwisted in a direction such as to open up the twist imparted by the stranding operation, the finished cord may not have the desired retractility.

When the cordage is made of a core having strands arranged in parallel relationship, no matter what direction is given to the pretwist imparted to the cord, the conductors are twisted from the beginning in a direction such as to impart retractility to the cord without any danger existing of breaking the tinsel ribbons during the twisting operation, or of such ribbons being broken when the finished cord is extended in its normal use. Thus, the provision of a core consisting of parallel-laid, individually insulated conductors plays an important part in the effectiveness, cheapness and uniformity of retractile jacketed cords embodying the invention.

While the apparatus shown on the accompanying drawings is designed to pretwist an individual cord and wind it helically in sequential steps, it is obvious that satisfactory retractile cords may be made from cordage of the type described hereinabove by withdrawing cordage from a supply reel provided with a suitable brake to apply back-tension to the withdrawn cordage, and to twist the withdrawn cordage and wind it helically upon a mandrel in a simultaneous operation. Suitable apparatus for performing this type of operation is shown and claimed in P. R. Powell Patent No. 2,583,119, granted January 22, 1952.

Figure 10:
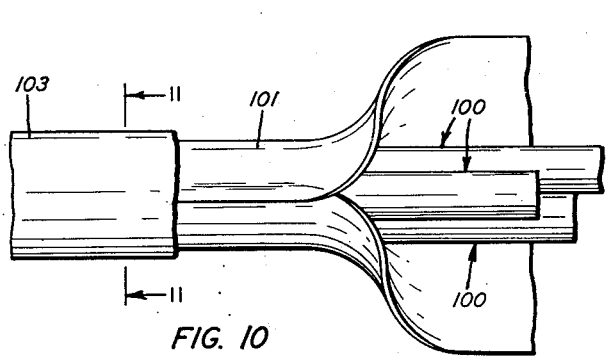
Fig. 10 is an enlarged view of a piece of another type of cordage suitable for use in making cords embodying the invention.
Figure 11:
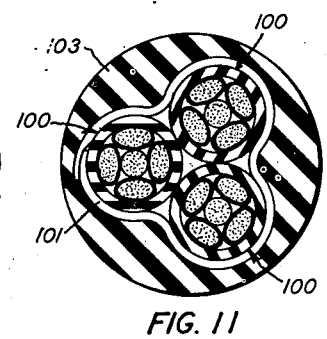
Fig. 11 is a further enlarged, cross-sectional view taken along line 11—11 of Fig. 10.
Figure 4:
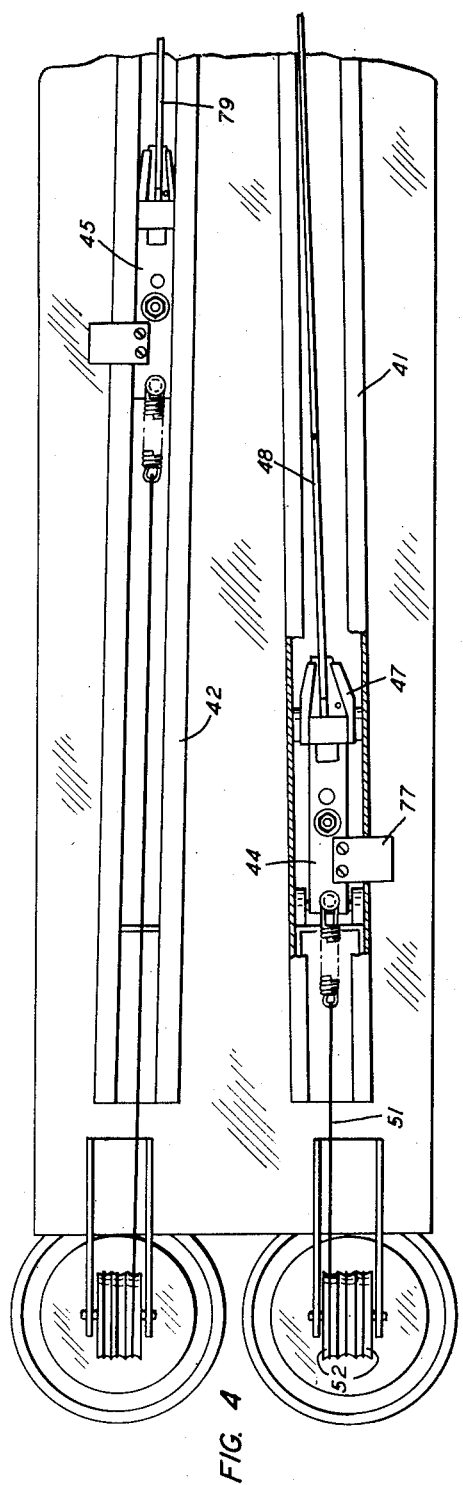
Fig. 4 is a fragmentary, top plan view of a portion of an apparatus for making cords embodying the invention.

Retractile cords embodying the invention also may be made from cordage of the type shown in Figs. 10 and 11 of the drawings. This cordage is identical with that shown in Figs. 1 and 2 of the drawings, except that the core formed by the parallel-laid, individually insulated conductors 100—100 is enclosed in a thin paper tape, which is formed into a longitudinally extending tube 101 surrounding the conductors.

In forming this type of cordage, the parallel individually insulated conductors 100—100 are advanced into an extruder, and the tape is advanced from a supply pad simultaneously into the extruder with its longitudinal axis paralleling the axes of the conductors. The tape passes through a suitable folding device, which causes the tape to be formed into the tube 101 surrounding the conductors 100—100 with the edges of the tape overlapped. The extruder forms a jacket 103 over the paper tube 101, and, when the jacket is cured, it adheres firmly to the tube.

The tube 101 is present in such cordage to expedite the stripping of the jacket from the conductors, since the paper tube sticks to the jacket and slides readily over the conductors. As is evident from Fig. 11 of the drawings, the jacket 103 is extruded over the paper tube with such force that the paper tube 101 is pressed into the indentations between the individual conductors 100—100, and the jacket material extends into the areas caused by the displacement of the paper tube. In consequence, the jacket 103 does not tend to be loose upon, or slide around, the conductors 100—100. However, when the jacket 103 and the tube 101 are cut circumferentially, they slide freely over the conductors in a longitudinal direction. This facilitates the finishing of the cords during the final operations of applying bands and terminals to the ends of cords that have been set in twisted, helical form.

The cordage mentioned hereinabove has been described as consisting of a plurality of parallel-laid, tinsel conductors individually insulated with a vulcanizable rubber insulating compound. Instead of using a rubber compound to insulate the individual tinsel conductors, compounds having other vulcanizable elastomers as their essential constituents may be used. For example, the individual tinsel conductors may be insulated with a neoprene compound, or with a high quality compound in which the vulcanizable constituent is Buna S (a copolymer of butadiene and styrene). Also, if desired, the individual conductors may be insulated with a thermoplastic material, such as polyethylene, polyvinyl chloride, or the like, or with a textile material, such as a cotton braid.

Likewise, the neoprene jacket employed in the cordage described hereinabove may be replaced with a jacket made of a rubber compound or of a Buna S compound. Such compounds would be made of such ingredients as to provide a tough, wear-resisting outer jacket on the cordage. The jacket should be made of material of such nature that, when a cord including the jacket is processed to place it in a twisted, helical form, the jacket may be set by heating it so that it will retain that twisted, helical form indefinitely.

Jacketed retractile cords, which have ready extensibility yet satisfactory retractility, have been made from cordage in which three parallel-laid conductors, individually insulated with rubber compounds, each having a diameter of approximately 0.070 inch formed the core, and in which the outer diameter of the neoprene jacket was approximately 0.200 inch. In actual commercial production, such cordage is given a twist along its longitudinal axis of from about sixty-five to about eighty turns over a length of approximately nine feet, and the twisted cordage is wound into a helix having an outer diameter of approximately 0.750 inch, with, of course, a sufficient amount of the cordage left untwisted and unwound at the ends thereof for the application of bands and tips. The cordage is heated while in its twisted, helical form for approximately ten minutes at a temperature of about 300° F. to set the cord in that form. There results a retractile cord having a central portion in twisted, helical form which is about eleven inches long in its normal retracted position, but which is intended to be extended in normal use to a length of approximately four feet.

Obviously, retractile jacketed cords may be made from cords having other dimensions and containing more or less than three conductors. The usual retractile cords employed in communication equipment, such as are used in association with telephone apparatus, employ from three to five tinsel conductors, and the cordage from which they are made may have an outside diameter of from about 0.200 inch to about 0.265 inch.

As pointed out hereinabove, jacketed retractile cords embodying the invention that are satisfactory in service may be made by twisting jacketed cordage, including a plurality of individually insulated conductors associated in parallel relationship, about its longitudinal axis, and then after the twisting has been completed winding the twisted cordage about a mandrel to form a close coiled helix. Retractile cords may be made by such a sequential twisting and winding operation with any suitable apparatus, of which the apparatus described hereinabove is illustrative. However, satisfactory retractile jacketed cords may be made by twisting cordage about its longitudinal axis and simultaneously winding it on a mandrel in helical form. Hence, in the annexed claims, whenever reference is made to twisting a cord about its longitudinal axis and coiling the cord while still twisted into a close helix, this language is intended to cover twisting and coiling operations performed either sequentially or simultaneously.

The individually insulated tinsel conductors forming the core of the cordage used in making jacketed retractile cords embodying the invention are substantially parallel to each other in the geometric meaning of that term. That is, the conductors extend side by side with their axes parallel and, if the axes are extended, they will meet only at infinity. When the word "parallel" is used herein and in the annexed claims, it is to be given this meaning, and is not to be confused with that term as sometimes used to cover two members running side by side in spirals or in other than straight lines. The term "parallel conductors" is intended particularly to differentiate from spiral or stranded conductors, such as are employed along with filler cords, and the like, to form the cores of cordage proposed heretofore for use in the manufacture of retractile cords.

What is claimed is:

1. A retractile cord, which comprises a predetermined length of cordage including a plurality of flexible conductors and a vulcanized jacket with the conductors and jacket twisted axially in the same direction and to substantially the same degree, coiled into a compact helix, and set in such twisted, helical form.

2. A retractile cord, which comprises a predetermined length of cordage including a plurality of flexible conductors and a vulcanized jacket with the conductors and jacket twisted axially in the same direction and to substantially the same degree, coiled into a compact helix in the same direction in which the jacket and conductors are twisted, and set in such twisted, helical form.

3. A retractile cord, which comprises a predetermined length of cordage consisting of a plurality of individually insulated, tinsel conductors and a vulcanized jacket with the conductors and the jacket twisted axially in the same direction and to substantially the same degree to introduce torsional stresses therein, coiled while still twisted into a compact helix in such a direction that the torsional stresses urge the convolutions of the helix together, and set in such twisted, helical form.

4. A retractile cord, which comprises a predetermined length of cordage consisting of a plurality of individually insulated, tinsel conductors and a vulcanized elastomer jacket with the conductors and the jacket except for the end portions thereof twisted axially in the same direction and to substantially the same degree, coiled into a compact helix, and set in such helical, twisted form, the end portions of said cord being untwisted and uncoiled.

5. A retractile cord, which comprises a predetermined length of cordage consisting of a plurality of tinsel conductors individually insulated with a vulcanized insulating compound having as its base an elastomer of the group consisting of rubber, polychloroprene, and copolymers of butadiene and styrene and an enclosed jacket over the conductors consisting of a vulcanized jacketing compound having as its base an elastomer of said group with the conductors and the jacket twisted axially in the same direction and to substantially the same degree, coiled while still twisted into a compact helix, and set in such twisted, helical form.

6. The method of making retractile cords from cordage including a plurality of flexible conductors enclosed in a vulcanized jacket in straight parallel relationship, which comprises supporting a length of such cordage required to make a retractile cord in a straight line under tension, twisting said length of cordage about its longitudinal axis while under said tension and in a straight line condition, coiling the length of twisted cordage into a compact helix, and then setting the cordage in such twisted, helical form.

7. The method of making retractile cords from cordage including a plurality of individually, insulated, flexible conductors enclosed in a vulcanized jacket in straight parallel relationship, supporting a length of such cordage required to make a retractile cord in a straight line under tension, twisting said length of cordage about its longitudinal axis while under said tension and in a straight line condition, coiling the length of twisted cordage into a compact helix extending in the same direction as the twist imparted to the cordage, and heating the cordage sufficiently to set it permanently in such twisted, helical form.

8. The method of making retractile cords from cordage consisting of a plurality of individually insulated, tinsel conductors enclosed in a vulcanized elastomer jacket in straight parallel relationship, supporting a length of such cordage required to make a retractile cord in a straight line under tension, twisting said length of cordage about its longitudinal axis while under said tension and in a straight line condition to introduce torsional stresses within the jacket and the conductors, coiling the length of twisted cordage into a compact helix in such a direction that the torsional stresses introducted into the cordage urge the convolutions of the helix together, and heating the cordage sufficiently to set it in such twisted, helical form.

9. The method of making retractile cords from cordage consisting of a plurality of tinsel conductors individually insulated with a vulcanized insulating compound having as its base an elastomer of the group consisting of rubber, polychloroprene, and copolymers of butadiene and styrene and enclosed in straight parallel relationship in an outer jacket composed of a vulcanized compound having as its base an elastomer of said group, which comprises supporting a length of such cordage required to make a retractile cord in a straight line under tension, twisting said length of cordage about its longitudinal axis while under said tension and in a straight line condition, coiling the length of twisted cordage into a compact helix while under said tension, and then setting the cordage in such twisted, helical form.

10. The method of making retractile cords, which comprises enclosing a plurality of individually insulated, tinsel conductors in a straight parallel relationship in a jacket of vulcanizable material to form a cord, vulcanizing said jacket, supporting the entire length of the cord in a straight line under tension, twisting said cord about its longitudinal axis while under said tension and in a straight line condition, coiling the twisted cord into a compact helix, and then setting the cord in such twisted, helical form.

THOMAS K. COX.
FRANCIS P. LYONS.

REFERENCES CITED

The following references are of record in the file of this patent:

UNITED STATES PATENTS

| Number | Name | Date |
|---|---|---|
| 1,804,732 | Alden | May 12, 1931 |
| 2,002,739 | Herkenberg | May 28, 1935 |
| 2,286,827 | Morrison | June 16, 1942 |
| 2,313,234 | Gavitt | Mar. 9, 1943 |
| 2,394,762 | Geraty | Feb. 12, 1946 |
| 2,413,715 | Kemp et al. | Jan. 7, 1947 |
| 2,427,197 | Cox | Sept. 9, 1947 |
| 2,452,433 | Collins | Oct. 26, 1948 |